United States Patent [19]

Seibert et al.

[11] Patent Number: 5,353,949

[45] Date of Patent: Oct. 11, 1994

[54] VENT FILTER ASSEMBLY

[75] Inventors: Jeffrey M. Seibert, Cortland; Riazuddin S. Rahimi, Town of Homer, both of N.Y.

[73] Assignee: Pall Corporation, East Hills, N.Y.

[21] Appl. No.: 947,384

[22] Filed: Sep. 21, 1992

[51] Int. Cl.⁵ ............................................. B65D 51/16
[52] U.S. Cl. ................................... 220/371; 220/304; 220/372; 220/745; 220/DIG. 27; 376/314; 55/385.1; 55/502
[58] Field of Search ............... 220/371, 304, 367, 372, 220/745, DIG. 27; 376/314, 272; 55/97, 384, 385.1, 525, 527, DIG. 9

[56] References Cited

U.S. PATENT DOCUMENTS

| | | | |
|---|---|---|---|
| 2,366,428 | 1/1945 | Scott | 220/371 X |
| 2,603,308 | 7/1952 | McCall | 220/372 |
| 2,650,673 | 9/1953 | Bering et al. | 220/371 |
| 3,048,958 | 8/1962 | Barnes | 220/745 X |
| 3,165,473 | 1/1965 | Pall et al. | 210/510 |
| 3,241,681 | 3/1966 | Pall | 210/493 |
| 3,327,866 | 6/1967 | Pall et al. | 210/499 |
| 3,690,606 | 9/1972 | Pall | 245/1 |
| 3,780,872 | 12/1973 | Pall | 210/493 |
| 4,136,796 | 1/1979 | DuBois et al. | 220/256 |
| 4,152,482 | 5/1979 | Reynolds et al. | |
| 4,263,140 | 4/1981 | Wujnovich et al. | 210/247 |
| 4,391,873 | 7/1983 | Brassell et al. | |
| 4,442,003 | 4/1984 | Holt | 210/445 |
| 4,500,328 | 2/1985 | Brassell et al. | 55/97 |
| 4,512,499 | 4/1985 | Uuskallio | 220/374 |
| 4,562,039 | 12/1985 | Koehler | 419/2 |
| 4,613,369 | 9/1986 | Koehler | 75/246 |
| 4,687,579 | 8/1987 | Bergmann | 210/347 |
| 4,706,836 | 11/1987 | Greck | 220/256 |
| 4,756,852 | 7/1988 | Temus | 220/371 X |
| 4,772,508 | 9/1988 | Brassell . | |
| 4,793,509 | 12/1988 | Coleman | 220/207 |
| 4,808,337 | 2/1989 | Ramm et al. | 252/628 |
| 4,822,692 | 4/1989 | Koehler | 428/547 |
| 4,828,930 | 5/1989 | Koehler | 428/547 |
| 4,842,909 | 6/1989 | Brassell . | |
| 4,957,518 | 9/1990 | Brassell . | |
| 4,957,522 | 9/1990 | Brassell . | |
| 5,054,402 | 10/1991 | Brassell . | |
| 5,149,360 | 9/1992 | Koehler et al. | 75/228 |

FOREIGN PATENT DOCUMENTS 598913 3/1948 United Kingdom .
1555001 11/1979 United Kingdom .

OTHER PUBLICATIONS

"The Pall Porous Metals Filter Guide", Pall Corporatioin, pp. 1–12, 1988 (month not available).
"Pall Porous Metal Filters For Solids Separation In Liquid And Gas Service", Pall Corporation, pp. 1–12, 1986 (month not available).
"The Pall Gas Solid Separation System For The Chemical Process, Refining, Adn Mineral Industries", Pall Corporation, pp. 1–17 (no date).

(List continued on next page.)

Primary Examiner—Allan N. Shoap
Assistant Examiner—Vanessa Caretto
Attorney, Agent, or Firm—Leydig, Voit & Mayer

[57] ABSTRACT

A vent filter assembly may be disposed in a wall of a sealed waste container containing radioactive waste or the like and utilized for venting gases. The vent filter includes a housing coupled to the container. The housing includes a first opening communicating with an interior of the container and a second opening communicating with an exterior of the container. The housing defines a gas flow path between the first and second openings. A filter is coupled to the housing and disposed across the gas flow path such that gas flowing between the openings flows through the filter. The filter includes a porous metal hydrophobic filter medium. The components of the assembly may be fabricated from materials that are durable and resistant to deterioration due to elements stored within the container, as well as environmental elements. Further, the components may be fabricated from the same or similar materials or materials which are compatible with one another.

18 Claims, 4 Drawing Sheets

OTHER PUBLICATIONS

"Porous Metal Filter Collects Radioactive Strontium In Hot Cell Operation", Chemical Processing, 1985 (month not available).

"Range Of Metal Media Produced By Pall", Pall Corporation, 1990 "The Pall S Series PSS Filter Element Guide", Pall Corporation, 1988 (month not available).

"Pall PMM Metal Membrane Filters", Pall Corporation, 1986 (month not available).

"Pall PMF Metal Fiber Filters For The Polymer Industry", Pall Corporation, 1986, 1990, pp. 1-7 (month not available).

"Pall's New Segmet And Segmax Metal Filter Segments", Pall Corporation, 1988, pp. 3-10 (month not available).

VENT FILTER ASSEMBLY

FIELD OF THE INVENTION

The invention relates generally to containers for the transport of radioactive waste, and more specifically to particulate filter assemblies for such containers.

BACKGROUND OF THE INVENTION

Radioactive waste is transported from various locations throughout the United States to storage locations such as Waste Isolation Plants (WIP). The waste is placed inside of containers, either steel bodies or special boxes, which are in turn sealed inside of special transport devices. A current design of such transport devices is sometimes referred to as TRUPACT-II. Typically, the transport devices are sealed from the ambient environment and are designed to withstand relatively high internal pressures.

While the transport devices are designed for relatively high internal pressures, the waste containers themselves are not. Many gases may be generated by the waste in a container. For example, hydrogen gas may be generated by radiolysis. Therefore, in order to prevent pressure from building-up within the waste container, the container may include one or more vent openings for the equalization of pressure between the interior and the exterior of the container. To prevent the release of particulate matter from the container, conventional containers include a filter assembly positioned across each vent opening and an elastomeric material, such as rubber, is used to seal the filter assembly to the container. The filter assembly is typically a block of porous carbon material which is sealed with an organic cement.

This conventional arrangement has several disadvantages. For example, the carbon block is brittle and, therefore, is not particularly rugged. Also, the carbon block may weaken when it is exposed to moisture and other environmental elements. Consequently, it is subject to cracking and disintegration due to physical shocks, such as jarring, which can occur during transport. Additionally, carbon blocks exhibit limited fire resistance and inconsistent filtration efficiency levels. Further, both the organic cement and the elastomeric seal may deteriorate after extended exposure to the elements inside and outside of the container. Elastomeric materials may also present compatibility problems with respect to the filter assembly and the container materials.

OBJECTS OF THE INVENTION

It is a general object of the invention to provide a vent filter assembly which vents gases off from a waste container without releasing particulates from the container. A related object is to provide a filter assembly which prevents the build up gases within the container and which allows the equalization of pressure between the interior and the exterior of the container.

Additional objects are to provide a high efficiency particulate (HEPA) filter which is particularly suitable for use with containers in transporting and storing radioactive waste; to provide a vent filter assembly that may be assembled into the current opening provided in radioactive waste storage containers and meets the government standards for filters for such containers; to provide a filter assembly comprising components fabricated of materials which are compatible with each other, as well as the material of the container; to provide a filter assembly which is resistant to deterioration due to the effects of the environment and of the material transported; to provide a filter assembly which is fire resistant and hydrophobic so that it resists wetting; and to provide a filter assembly which is durable in that it is resistant to impacts, jarring, and the like.

SUMMARY OF THE INVENTION

In accomplishing these and other objectives, the invention provides a vent filter assembly for venting gases from a sealed waste container without releasing particulates. The filter assembly comprises a housing defining a gas flow path between a first opening and a second opening, where the first opening can communicate with the interior of the container and the second opening can communicate with the exterior of the container. The filter assembly further comprises a filter which includes a porous metal medium. The filter is arranged with the housing across the gas flow path such that gas flowing between the openings flows through the filter. The filter assembly also comprises a means for coupling the housing to the waste container.

The invention further provides a container assembly for transporting or storing waste, the container assembly comprising a container, a housing, and a filter. The housing is mounted to the container and defines a gas flow path between a first opening and a second opening, where the first opening communicates with the interior of the container and the second opening communicates with the exterior of the container. The filter includes a porous metal hydrophobic filter medium and is arranged within the housing across the gas flow path such that gas flowing between the openings flows through the filter.

In the preferred embodiments, the housing may comprise stainless steel. The filter may comprise a HEPA rated, fiber metal hydrophobic filtration medium and is preferably in sheet form, either flat, corrugated or cup-shaped. The filter may be disposed within the housing, and the filter and housing may be sealed together in any suitable manner, such as by welding or due to close tolerances of the mating components. The means for coupling the housing to the container may comprise threads or the like which mate with a standard fitting in the wall of the container. The housing may be sealed to the wall by a gasket or the like to prevent leakage between the adjacent surfaces.

According to an important aspect of the invention, gas may be vented from or supplied to a waste container to maintain equal pressure on the inside and outside of the container and yet particulates remain trapped within the container by the filter. In addition, the components of the vent filter assembly may be fabricated from materials that are durable and resistant to deterioration due to elements stored within the container, as well as environmental elements. Further, the components may be fabricated from the same or similar materials, or materials which are compatible with one another.

These and other features and advantages of the invention will be more readily apparent upon reading the following description of a preferred exemplified embodiment of the invention and upon reference to the accompanying drawings.

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figure 1:
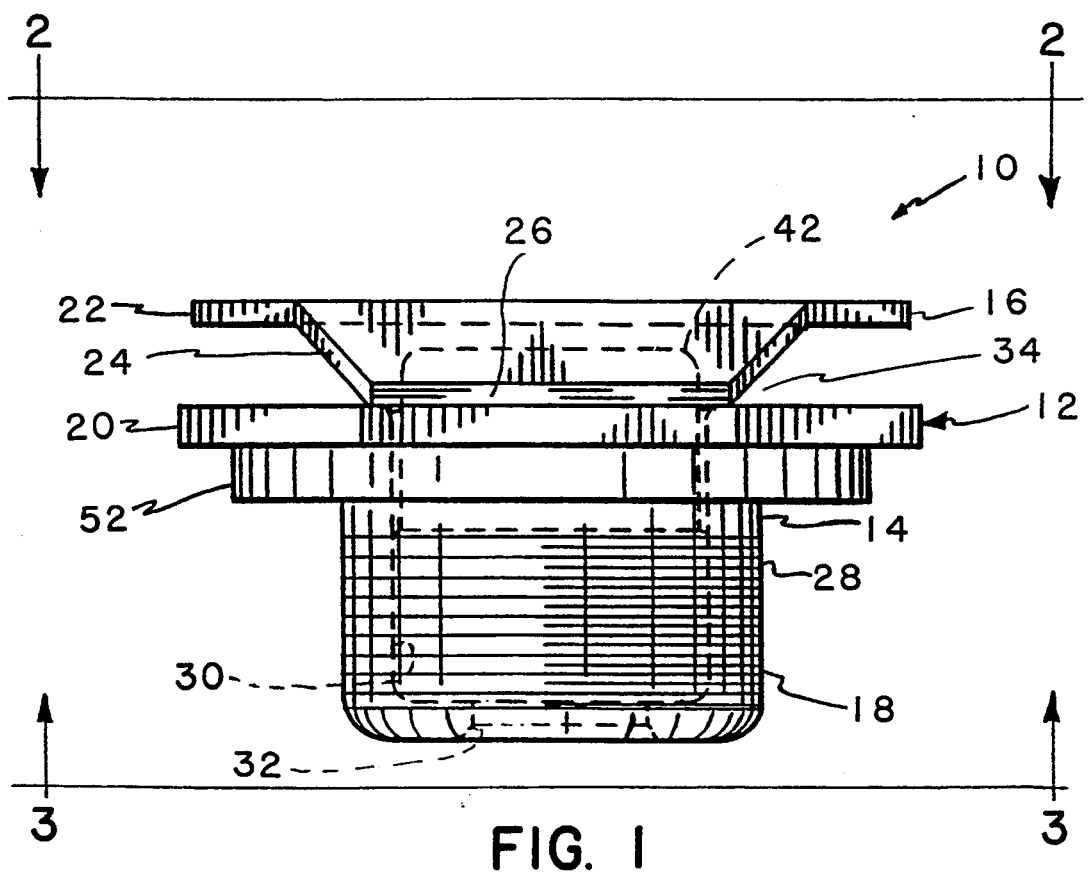
FIG. 1 is side view of a vent cap filter assembly constructed in accordance with teachings of the invention.
Figure 4:
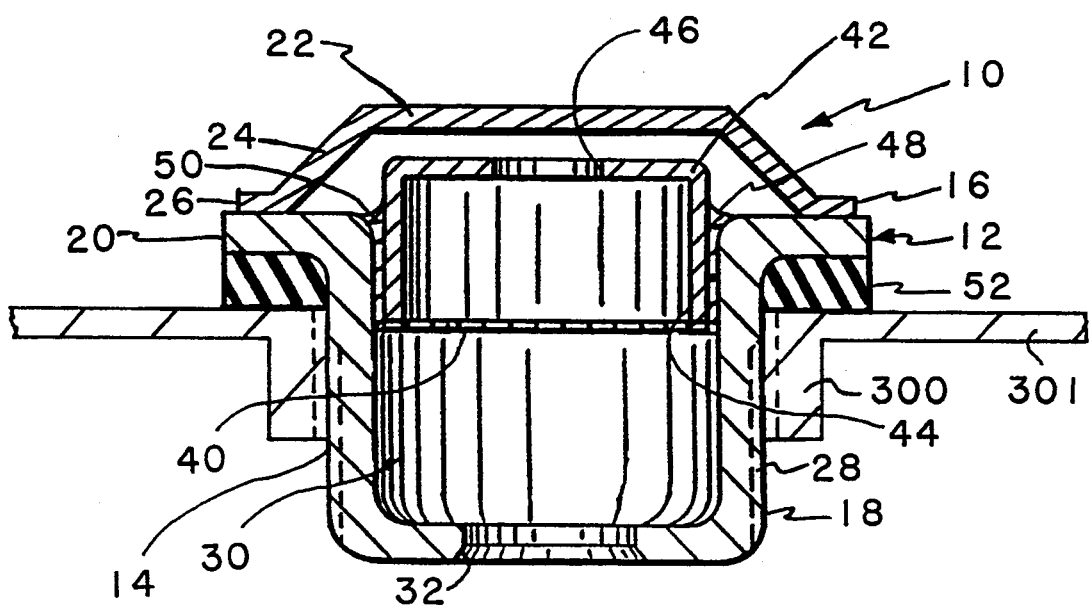
FIG. 4 is a cross-sectional view of the vent cap filter assembly taken along line 4—4 in FIG. 2.

Turning now to the drawings, there is shown in FIG. 1 a vent filter assembly 10 for a waste container (not shown), such as those utilized for transporting radioactive waste. In use, the filter assembly 10 is disposed within a bore in a wall of the container. For example, the filter assembly 10 may be disposed in a fitting 300 in the lid 301 of the container, as shown in FIG. 4. The filter assembly 10 defines a flow path therethrough for the release of gases and the equalization of pressure.

Figure 2:
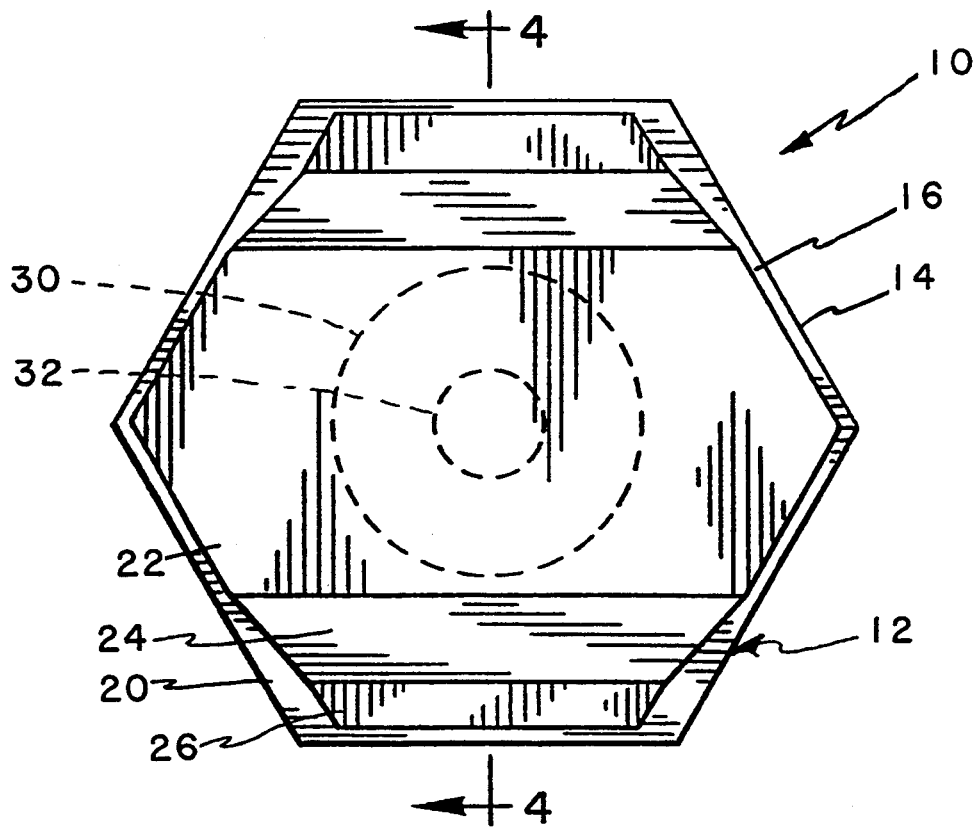
FIG. 2 is the top view of the vent cap filter assembly of FIG. 1.

The filter assembly 10 comprises a housing 12 having a body 14 and a cover 16, which may be provided with any appropriate shape. In the first illustrated embodiment, the body 14 includes a barrel-shaped portion 18 with a radially extending flange 20 at its upper end. As best seen in FIGS. 1, 2, and 4, the cover 16 has a winged profile. The cover 16 comprises a relatively flat upper portion 22 with arms 24 which extend downward to flanges 26 disposed adjacent the upper surface flange 20 of the body 14. It will thus be appreciated that gas flow may proceed through the space defined between the flat portion 22 and arms 24 of the cover 16 and the upper surface of the flange 20 of the body 14.

While the cover 16 may be secured to the body 14 by any appropriate method, in the preferred embodiment, the cover 16 and body 14 are secured together by resistance welding or the like. If welded, the entire assembly may be annealed in a reducing atmosphere after welding to remove any oxidation or residual stress caused by fabrication. The assembly may also be solution annealed to improve corrosion resistance.

The body 14 and cover 16 are formed from materials with good structural integrity, and resistance to degradation due to chemicals or environmental elements. Stainless steel or stainless steel alloys are currently preferred because of their high resistance to corrosion. While the body 14 and cover 16 may be fabricated by any appropriate method, machining, or stamping and machining are particularly well suited for forming these components.

In order to properly position the filter assembly 10 within the container wall and prevent relative movement therebetween, the invention provides means for coupling the housing 12 to the wall of the container. In this embodiment, the coupling means comprises threads 28 provided along at least a portion of the peripheral surface of the barrel-shaped portion 18 of the body 14. The threads 28 along the portion 18 mate, for example, with threads provided in the inner surface of the bore of the fitting 300 in the container wall. Once assembled into the container bore, the flange 20 is positioned along the exterior of the container. While the means for coupling the housing 12 to the container wall has been described with reference to threads along the mating surfaces of the housing 12 and the bore, it will be appreciated that an alternate coupling method may be provided. For example, the housing may be welded or brazed to the container.

To facilitate assembly of the filter assembly 10 into the container bore, the upper portion of the housing 12 may be provided with an appropriate geometric shape, slot, or the like. In this way, an appropriately shaped tool (not shown) may be used to assist in securely positioning the assembly 10 into the bore. As best seen in FIG. 2, in the exemplified embodiment, the upper portion of the filter assembly 10 has an hexagonal shape. Consequently, a standard wrench may be utilized in screwing the assembly 10 into the bore in the container wall. Alternately, the cover 16 may be formed with a slot (not shown) or the like so that a screw driver-type device may be used to screw the assembly 10 into the bore. As a deterrent to tampering, the cover 16 and/or flange 20 may alternately be formed into a shape that requires the use of a specialized tool for inserting or removing the assembly 10 from the bore.

In accordance with an important aspect of the invention, in order to prevent a buildup of gases (including hydrogen) within the container, the housing has openings to vent the gases to the exterior of the container. For example, in the first embodiment, the housing 12 comprises an interior chamber 30 having an inlet 32 and an outlet 34 which define the flow path between the interior and the exterior of the container. It will be appreciated that the cover 16 prevents rain or the like from reaching the interior chamber 30 of the housing 12 and wetting the filter medium or flowing into the interior of the container. In the following description of the preferred embodiment, it will be assumed that the flow of fluid proceeds from the interior of the container to the exterior to prevent a buildup of gases within the container. It will be appreciated, however, that flow proceeds in either direction through the filter assembly 10 in order to provide an equalization of pressure between the fluid contained within the container and the surrounding atmosphere.

Figure 3:
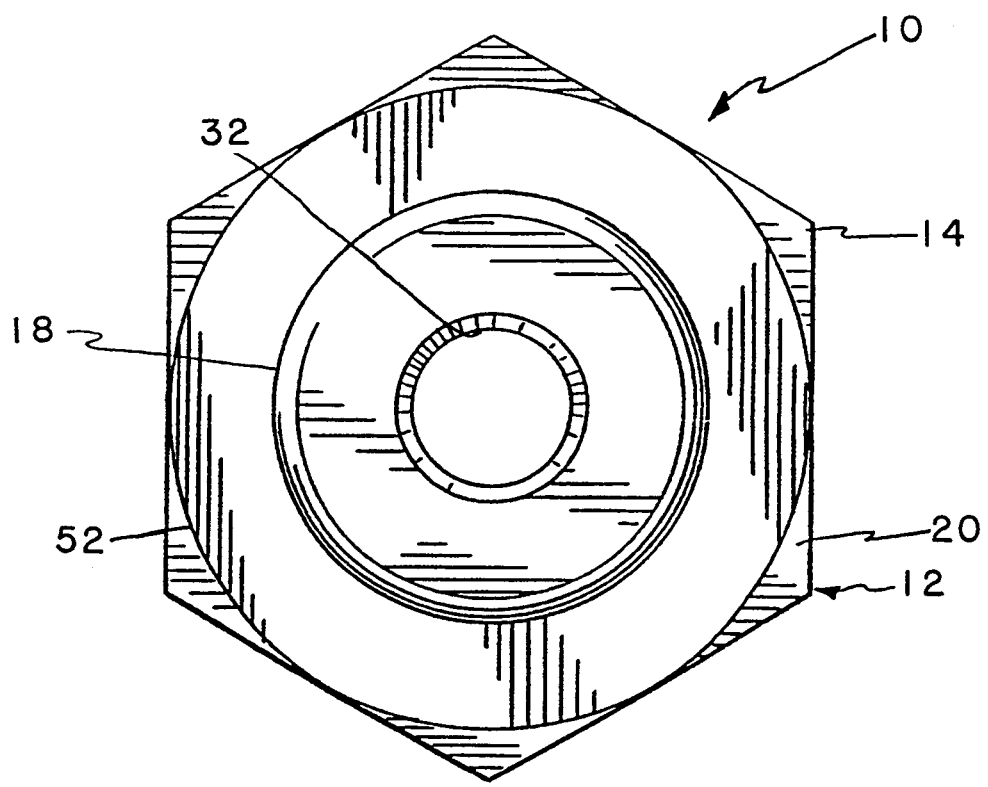
FIG. 3 is the bottom view of the vent cap filter assembly of FIG. 1.

As seen most clearly in FIGS. 3 and 4, in the first exemplified embodiment, the inlet 32 is provided in the form of a bore through the lower surface of the body 14. It will be appreciated, however, that the inlet could be of an alternate design. For example, if the body protruded into the interior of the container when positioned in the bore in the container wall, the inlet might comprise multiple openings about the periphery of the barrel-shaped portion of the body.

In the illustrated embodiment, the outlet 34 is formed between the cover 16 and the body 14. The housing 12 thus defines a fluid path between the inlet 32 and the outlet 34 which proceeds through the interior chamber 30 and through the space defined between the flat portion 22 and arms 24 of the cover 16 and the upper surface of the flange 20 of the body 14.

In order to prevent particulates or the like from escaping from the interior of the container, a filter 40 is arranged with the housing 12 across the flow path. For example, the filter 40 may be disposed within the interior chamber 30 in the flow path. When utilized within containers containing radioactive waste, the filter may have certain desirable characteristics regarding efficiency, pressure drop, and hydrogen diffusivity. For example, the filter preferably has an efficiency of at least about 99.97% with 0.3 to 0.5 micron particles of DOP smoke, i.e., is HEPA rated. The flow of air through the filter is preferably no less than 200 milliliters/minute at one inch of water gauge pressure drop. The hydrogen diffusivity is preferably at least about $1.9 \times 10^{-6}$ mole/-second per mole fraction measured at room temperature (25° C.). Further, the filter is preferably hydrophobic, i.e., resists wetting by water, both initially and after a predetermined exposure to radiation.

According to an important aspect of the invention, the filter comprises a porous metal filter medium. Any suitable metal, such as stainless steel or bronze, in any suitable form, such as fiber metal or powder metal, may be used to fashion the metal filter medium. Preferred media include metal membrane filters available from Pall Corporation under the trade designation PMM ®, porous metal filters available from Pall Corporation under the trade designation PSS ®, and metal fiber filters available from Pall Corporation under the trade designation PMF TM. The porous metal medium may have any suitable configuration. For example, the metal medium may be a thin porous sheet which is flat, corrugated, and/or formed into a suitable shape. Alternatively, the metal medium may be a porous mass, such as a solid or hollow cylinder. In addition to the porous metal filter media, the filter assembly may include other elements, such as a prefilter formed from a metallic or a non-metallic porous material or a contaminant removal element formed from a sorbent material.

In the illustrated embodiment, the filter 40 preferably consists of no more than a sheet of porous metal filter medium. Consequently, the filter 40 may be easily fabricated, for example, by piercing it out of sheet material and forming it into a cup. Further, the filter wall may be coined to a uniform thickness to facilitate a leak-free seal between the filter wall and the adjacent surfaces, as explained in greater detail below. If the filter 40 is formed from a material which is not inherently hydrophobic, such as stainless steel, it may be treated according to conventional techniques to render it hydrophobic.

In order to maintain the filter 40 in the desired position within the interior chamber 30 of the housing 12, the invention provides means for retaining the filter 40 within the flow path. For example, the retaining means may comprise a retainer ring. The retainer ring may fabricated by any appropriate method and from any appropriate rigid and degradation resistant material and may have any suitable configuration. In a preferred embodiment, the ring is either stamped or machined from stainless steel. Thus, the ring may be easily and economically fabricated. In the first illustrated embodiment, the retainer ring 42 is generally cap-shaped and has upper and lower openings 44,46 to permit the flow of gas through the retainer ring 42. To secure the filter 40 in position, the retainer ring 42 is disposed inside of the filter cup 40 with the annular portion of the filter cup 40 sandwiched between the ring 42 and the inside wall of the barrel-shaped portion of the body 14.

In order to prevent possible leakage of fluid around the outer surface of the annular portion of the filter 40 and the inside wall of the barrel-shaped portion 18 of the body 14, the invention provides means for sealing the filter 40 to the housing 12 to prevent flow therebetween. Consequently, flow between the interior and exterior of the container proceeds through the filter 40 and the openings in the retainer ring 42.

Any conventional metal joining method, such as brazing, may be used to seal the filter 40 to the housing 12. For example, in the first illustrated embodiment, a weld line 48 is placed along the upper edge 50 of the filter cup 40 to seal the filter 40 to both the retainer ring 42 and the body 14 of the housing 12. In order to minimize oxidation, the weld is preferably formed with an argon or other inert gas shield. Weld filler may be used, if necessary. If the edge of the filter medium projects over the flange 20 of the body 14, however, the use of filler rod will not generally be necessary. Typically, filler rod will not be necessary if an ⅛ inch of the filter media projects over the top of the flange 20. Thus, the sealing of the components together prevents fluid from flowing between the adjacent surfaces. Additionally, the weld 48 further secures the components together to stabilize the filter assembly 10.

While the seal of the exemplified embodiment comprises a weld 48 along the upper edge 50 of the filter 40, alternate sealing means may be provided. For example, the filter may be sealed to the lower annular edge of the retainer ring by welding, brazing or the like, and the retainer ring may further be sealed to the housing in the same manner. Alternately, the adjacent sealing surfaces of the assembly may be fabricated to closely controlled tolerances so that a press fit of the components may be sufficient to provide a leak-free seal. Any appropriate method may be utilized that provides closely controlled dimensions of the inside annular surface of the body 14 and the outside annular surface of the retainer ring 42. For example, the body 14 and the retainer ring 42 may be machined or stamped and machined to provide the desired dimensions.

Further, in order to ensure a leak-free seal between the housing 12 and the container wall, the invention provides means for sealing the housing 12 to the wall. The sealing means is preferably in the form of a gasket 52, which is disposed below the flange 20 about the barrel-shaped portion 18 of the body 14. According to an important aspect of the invention, the gasket is fabricated from a material which is resistant to deterioration due to the elements contained within the container, as well as environmental elements, such as extended exposure to heat and moisture. For example, in order to minimize or eliminate compatibility problems, the gasket 52 is fabricated from a material that is compatible with, and preferably the same as, the adjacent housing material. Thus, the gasket may be is fabricated of stainless steel metal fiber. Alternatively, the gasket may be fashioned as a stainless steel/graphite composite or as a graphite composite. The gasket 52 provides a durable, leak-proof seal between the housing 12 and the container wall.

Figure 5:
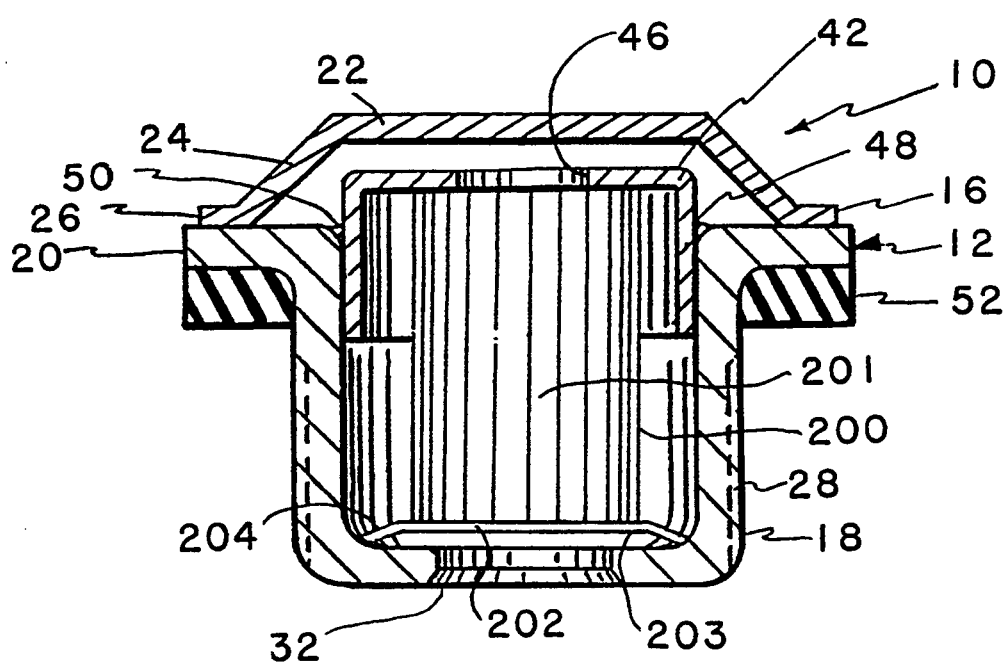
FIG. 5 is a partial cross-sectional view of another embodiment of a vent cap filter assembly constructed in accordance with teachings of the invention.

A second embodiment of the invention is shown in FIG. 5. This second embodiment is similar to the first embodiment shown in FIGS. 1–4 except for the filter 200. Components of the second embodiment which are similar to components of the first embodiment are labeled with identical reference numerals.

In the second embodiment, the retainer ring 42 may be welded directly to the body 14 of the housing 12. In addition, the filter 200 is preferably hollow and arranged with the housing 12 so that gas flowing between the openings 32,34 flows outside-in through the filter 200.

Otherwise, the filter 200 preferably meets the design criterion set forth with respect to the first embodiment, for example, when utilized within containers containing radioactive waste. Similar filter media are appropriate. The filter 200 may be formed from a rectangular sheet of porous metal filter medium. After the sheet is corrugated, the ends of the corrugated sheet may be joined to form a hollow, cylindrical filter element 201 with axially extending pleats. One end of the filter element 201 may be joined, e.g., by welding or brazing, to the retainer ring 42 with the end of the filter element 201 encircling the opening 46 in the retainer ring 42. This allows gas to communicate between the interior of the hollow filter element 201 and the exterior of the container. The opposite end of the filter element 201 may be maintained above the inlet 32 to allow gas to flow from the interior of the container to the exterior of the filter element 201. For example, the opposite end of the filter element 201 may be joined, e.g., by welding or brazing, to the base 202 of a spider 203. The spider base 202 then serves as a blind end cap for the filter element 201. The legs 204 of the spider extend from the base and serve to center the filter element 201 within the interior chamber 30 of the housing 12 and maintain the base 202 of the spider 203 above the housing inlet 32.

In the second illustrated embodiment, gas is vented from the container by flowing outside in through the filter 200. Alternatively, the filter and the housing may be arranged to allow gas to flow inside-out through the filter 200 to vent gas from the container. For example, the filter 200 shown in FIG. 5 may be inverted so that one end of the filter element is joined to the housing 12 encircling the inlet 32. The opposite end of the filter element would again be joined to a spider but the spider would be disposed in the retaining ring.

Regardless of whether flow is directed outside-in or inside-out through the filter, the hollow pleated filter element of the second embodiment has a greater surface area and, therefore, a lower pressure drop for a given flow rate than the filter of the first embodiment.

Figure 6:
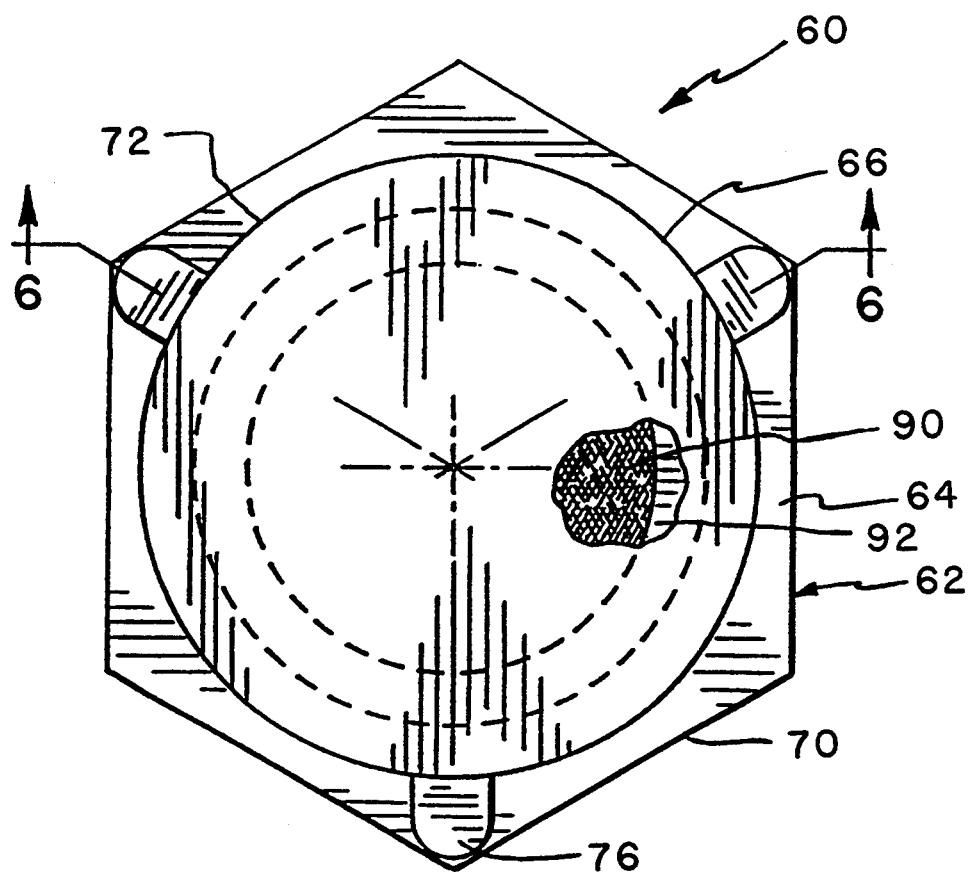
FIG. 6 is the top view of another embodiment of a vent cap filter assembly constructed in accordance with teachings of the invention. Portions of the cover and retainer ring are cut away to show the filter.
Figure 7:
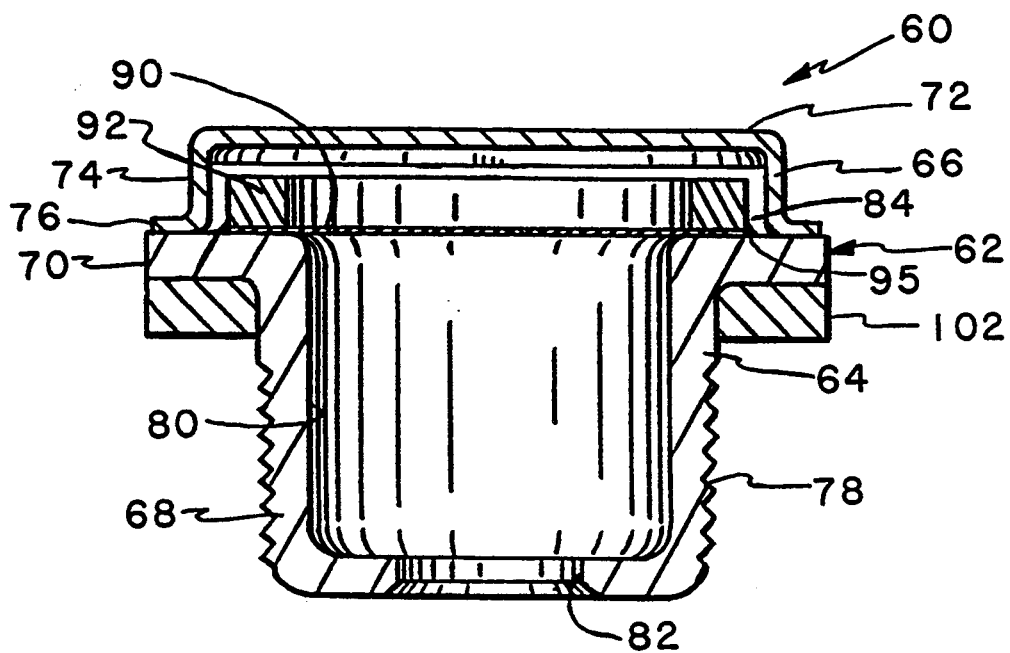
FIG. 7 is a cross-sectional view of the vent cap filter assembly taken along line 6—6 in FIG. 5.

A third embodiment of the invention is shown in FIGS. 6 and 7. Many of the components of the third embodiment are similar to the corresponding components of the first embodiment illustrated in FIGS. 1-4. For example, the vent filter assembly 60 of the third embodiment includes a housing 62 having a body 64 and a cover 66. The body 64 is formed in substantially the same shape as the body 14 of the first embodiment. More specifically, the body 64 includes a barrel-shaped portion 68 with a radially extending flange 70 at its upper end.

Threads 78 are provided along at least a portion of the peripheral surface of the barrel-shaped portion 68 of the body 64. The threads 78 along the barrel-shaped portion 68 mate with threads provided in the inner surface of the bore in the container wall. Once assembled into the container bore, the flange 70 is positioned along the exterior of the container. A seal is provided between the housing 62 and the container wall by a gasket 102. The upper portion of the filter assembly 60 preferably forms a hexagonal shape so that a standard wrench may be utilized in screwing the assembly 60 into the bore in the container wall.

The cover 66 of this embodiment comprises a substantially disk-shaped portion 72 from which a plurality of legs or tabs 74 extend. When assembled, the tabs 74 extend downward toward the upper surface of the flange 70 of the body 64 and bend outward to form tabs 76 disposed substantially parallel to upper surface of the flange 70. It will thus be appreciated that flow may proceed through the arch or space defined between the flat disk portion 72 and the upper surface of the flange 70 of the body 64.

The cover 66 may be secured to the body 64 by any appropriate method. Preferably, however, the cover 66 and body 64 are secured together by resistance welding or the like. As with the first embodiment, if welded, the entire assembly may be annealed in a reducing atmosphere and/or solution annealed after welding. Further, the body 64 and cover 66 are preferably formed from materials with good structural integrity and resistance to degradation due to chemicals or environmental elements, and may be fabricated by any appropriate method. It will be appreciated that the cover 66 in this embodiment is particularly suited to stamping.

The housing 62 comprises an interior chamber 80 having an inlet 82 and an outlet 84 which define the flow path between the interior and the exterior of the container. As with the first embodiment, the following description assumes that the flow of fluid proceeds from the interior of the container to the exterior. It will be appreciated, however, that flow proceeds in either direction through the filter assembly 60 in order to provide an equalization of pressure between the fluid contained within the container and the surrounding atmosphere. Further, specific elements, such as hydrogen, diffuse through the filter assembly 60 until equilibrium is established.

In the embodiment illustrated in FIGS. 6 and 7, the filter 90 is disposed within the interior chamber 80 and is in flat sheet form. Consequently, the filter 90 may be easily fabricated by piercing a circular disk of a porous metal filter medium from a sheet material. It will be appreciated that the filter of this embodiment requires no additional forming or coining, and, thus, significantly reduces the fabrication costs.

As with the first embodiment, the filter 90 is disposed in the flow path in order to prevent particulates or the like from escaping from the interior of the container. Further, the filter 90 preferably meets the design criterion set forth with respect to the first embodiment, for example, when utilized within containers containing radioactive waste. Similar filter media are appropriate.

In this embodiment, the means for retaining the filter 90 in the flow path may comprise welding. While the filter 90 may be welded or otherwise joined directly to the housing 62, this embodiment also includes a retainer ring 92. The filter 90 is preferably disposed between the lower surface of the retainer ring 92 and the upper surface of the flange 70 of the body 64 and welded at 95 to secure and seal the components 92, 90, 64 together.

As in the first embodiment, the retainer ring 92 may fabricated by any appropriate method and from any appropriate rigid and degradation resistant material. However, unlike the cap-shaped retainer ring 42 of the first embodiment, the retainer ring 92 of the third embodiment is generally annular. In a preferred embodiment, the ring 92 is either stamped or machined from stainless steel, such as a 304 or 316 stainless steel alloy. Thus, the ring 92 may be easily and economically fabricated.

We claim as our invention:

1. A container assembly for transporting or storing waste comprising:
    a container;
    a housing coupled to the container and having a first opening communicating with an interior of the container and a second opening communicating with an exterior of the container, the housing defining a gas flow path between the first and second openings; and
    a filter including a porous metal hydrophobic filter medium and arranged with the housing across the gas flow path such that gas flowing between the openings flows through the filter.

2. The container assembly as claimed in claim 1 wherein the filter comprises a stainless steel medium.

3. The container assembly as claimed in claim 1 having means for sealing the filter to the housing including welding.

4. The container assembly as claimed in claim 1 including means for coupling the housing to the container having threads disposed along an outer diameter of the housing.

5. The container assembly as claimed in claim 1 including means for sealing the housing to the container using a gasket.

6. The container assembly as claimed in claim 5 wherein the gasket comprises metal fiber.

7. The container assembly as claimed in claim 5 wherein the gasket comprises stainless steel metal fiber.

8. The container assembly as claimed in claim 1 wherein the cover has an arch shape and legs, and a means for coupling the legs to the body, the arch shape defining the outlet between the body and the cover.

9. The container assembly as claimed in claim 8 wherein the means for coupling the legs to the body comprises welding.

10. The container assembly as claimed in claim 1 wherein the filter is coupled to the housing by welding.

11. The container assembly as claimed in claim 1 wherein the housing comprises a head which extends along an outside portion of the container and a base portion extending through a wall of the container, the head having the general shape of a polygon to facilitate an insertion of the housing into the wall.

12. The container assembly as claimed in claim 1 wherein the filter has a disk shape.

13. The container assembly as claimed in claim 1 wherein the filter has a hollow cylindrical configuration.

14. The container assembly as claimed in claim 13 wherein the filter is pleated.

15. The container assembly as claimed in claim 1 wherein the filter is HEPA-rated.

16. A vent filter assembly mountable to a waste container, the vent filter assembly comprising:
    a housing having a first opening which can communicate with an interior of the container and a second opening which can communicate with an exterior of the container, the housing defining a gas flow path between the first and second openings;
    a filter including a HEPA-rated porous metal filter medium coupled to the housing across the gas flow path such that gas flowing between the openings flows through the filter wherein the filter is hydrophobic; and
    means for coupling the housing to the container.

17. A container assembly for transporting or storing waste, comprising, in combination:
    a container having a wall, the wall having an opening therethrough,
    a vent filter assembly being disposed within the wall to filter gas flowing therethrough, the vent filter assembly including:
    a housing defining an interior chamber, having an inlet and an outlet, and defining a gas flow path therethrough, the housing comprising:
        a body,
        a cover, and
        means for coupling the cover to the body,
        means for coupling the housing to the wall,
        means for sealing the housing to the wall to prevent a flow of gas between the housing and the wall,
        a filter disposed within the gas flow path such that flow proceeds through the openings and the filter, the filter being in a sheet form, wherein the filter is HEPA-rated and hydrophobic,
        means for retaining the filter within the gas flow path, and
        means for sealing the filter to the housing.

18. A container assembly comprising:
    a container for storing radioactive waste;
    a housing coupled to the container and having a first opening communicating with an interior of the container and a second opening communicating with an exterior of the container, the housing defining a gas flow path between the first and second openings; and
    a filter including a HEPA-rated porous metal hydrophobic filter medium welded to the housing across the gas flow path such that gas flowing between the openings flows through the filter.

* * * * *